(12) United States Patent
Kim et al.

(10) Patent No.: US 7,682,448 B2
(45) Date of Patent: Mar. 23, 2010

(54) HIGH COMPRESSIVE STRENGTH SILICA MORTAR AND MANUFACTURING METHOD THEREOF

(75) Inventors: Young Do Kim, 2/5 689-4, Hupyeong2-dong, Chuncheon-si, Gangwon-do (KR) 200-969; Se Gu Son, Gangwon-do (KR); Seung Yeob Hong, Gangwon-do (KR); Soo Bok Jeong, Dajeongwangyeok-si (KR)

(73) Assignees: Young Do Kim, Gangwon-do (KR); Yeram Communication Co., Ltd, Daejeon (KR)

( * ) Notice: Subject to any disclaimer, the term of this patent is extended or adjusted under 35 U.S.C. 154(b) by 0 days.

(21) Appl. No.: 12/055,508

(22) Filed: Mar. 26, 2008

(65) Prior Publication Data

US 2009/0229493 A1  Sep. 17, 2009

(30) Foreign Application Priority Data

Mar. 13, 2008 (KR) ...................... 10-2008-0023404

(51) Int. Cl.
   *C04B 28/08* (2006.01)
   *C04B 14/04* (2006.01)
   *C04B 18/14* (2006.01)

(52) U.S. Cl. ...................... 106/789; 106/813

(58) Field of Classification Search ................ 106/789, 106/813

See application file for complete search history.

(56) References Cited

U.S. PATENT DOCUMENTS 5,227,143 A * 7/1993 Stewart et al. .............. 423/197
6,110,434 A * 8/2000 Pickens et al. .............. 423/132
6,296,817 B1 * 10/2001 Park et al. ................... 423/119

FOREIGN PATENT DOCUMENTS

| JP | 2001-240438 A | * | 9/2001 |
| JP | 2002-179423 A | * | 6/2002 |
| JP | 2003-192336 A | * | 7/2003 |
| JP | 2003-212538 A | * | 7/2003 |
| KR | 2001-0098022 | | 11/2001 |
| KR | 10-0348688 | | 7/2002 |

OTHER PUBLICATIONS

Derwent Acc No. 2008-B22997, abstract of Korean Patent Specification No. KR 2006109596A (Oct. 2006).*

* cited by examiner

*Primary Examiner*—Anthony J Green
(74) *Attorney, Agent, or Firm*—Ladas & Parry LLP

(57) ABSTRACT

A high compressive strength silica mortar to be used for the installation of constructs such as building inside and outside walls, the road pavement, a slope and planting trees in the roof and manufacturing method thereof are provided. The high compressive strength silica mortar is formed of 30 to 60 wt % of silica, 40 to 70 wt % of blast furnace slag, and the 15 to 35 weight parts of polycondensation regulator for 100 weight parts of dry mortar powder of these silica and blast furnace slag, and is solidified by generating C—S—H, C-A-H, amorphous Geopolymeric Matrix$\{Al_2O_3 \cdot mSiO_2 \cdot nM_2O \cdot xH_2O$ (M=K,Na,Ca)$\}$ and Zeolite in the mortar. In particular, the high compressive strength silica mortar exhibits the compressive strength of 70.0 MPa or more by vibration forming and curing for 12~48 hours at 25 to 80° C. before removal of form and aging for 28 days, and can save energies because a firing process is not required. Accordingly, the high compressive strength silica mortar has excellent properties compared with conventional cement concretes or polymer cements, and further shows high compressive strength in initial stage, which could not be generated in such products.

6 Claims, 5 Drawing Sheets

HIGH COMPRESSIVE STRENGTH SILICA MORTAR AND MANUFACTURING METHOD THEREOF

CROSS REFERENCE TO RELATED APPLICATIONS

This application claims priority under 35 U.S.C. § 119 from Korean Patent Application 10-2008-0023404, filed on Mar. 13, 2008 the contents of which are hereby incorporated by reference in their entirety for all purposes as if fully set forth herein.

BACKGROUND OF THE INVENTION

1. Field of the Invention

The present invention relates to a high compressive strength silica mortar and manufacturing method thereof, which is capable of exhibiting much better properties than those of conventional cement concrete or polymer cement, and more particularly, to a high compressive strength silica mortar and manufacturing method thereof, which is capable of providing reliability by recycling silica that is not utilized, and saving energy by exhibiting a higher compressive strength than cement, polymer cement, and clay bricks after curing for 28 days without an artificial firing process.

2. Discussion of Related Art

A conventional mortar has been developed and improved by various compositions according to the purpose of use. The mortar has been mainly used as joint fillers and adhesives. The fact is that mortars using pozzolan materials such as a plaster or lime, or blended cement including admixtures such as a fly ash, a slag and silica fume, and compositions with polymer addition for allowing the water resistance and elastic function that main materials are cement, have been developed and marketed.

Such products of which main materials are cement have been used at various fields or construction sites due to very easy work and a moderate price thereof. However, coal and petroleum resources consumed for producing cement emit enormous amounts of $CO_2$ gas in heat treatment procedures and limestone composed of $CaCO_3$ also emits $CO_2$ gas during the production of cement. For producing cement, it is impossible to avoid the occurrence of $CO_2$ gas, which is one of main causes that cause environmental and air pollution.

The use of cement, polymer and a firing product, which cause environmental and air pollution, is sublated, and the development of environmentally and naturally friendly technology has been recently carried out. The Korean Patent No. 10-0344446 discloses a clay composition with lime and limestone added to clay without the use of cement or polymer, which has the compressive strength of 145~176 $kgf/cm^2$.

Further, the Korean Patent No. 10-0348688 discloses a technology for manufacturing mortar using clay, lime, blast furnace slag and alkali agents, which shows the compressive strength of 412 $kgf/cm^2$ at age of 14 days as the maximum strength. Such mortar is obtained by the recycling of industrial by-products, and accordingly, the consumption of enormous amounts of energy is not required and there is almost no damage to the nature. Also, in view of the environment, the mortar is very favorable product for our life because the occurrence of $CO_2$ is very low.

However, the environmentally friendly products have a defect such that the low compressive strength of 412 $kgf/cm^2$ is provided, and thus, cement products are still used in applied fields requiring high compressive strength

SUMMARY OF INVENTION

Accordingly, embodiments of the invention provide a high compressive strength silica mortar and its manufacturing method using silica to exhibit much better properties than those of conventional cement concrete or polymer cement, and high compressive strength in initial stage which could not be found in those conventional cement products.

In particular, embodiments of the invention provide a manufacturing method for environmentally friendly construction material that does not use organic polymers to improve environment pollution by restricting cement use while improving the low compressive strength of cement mortar with the compressive strength of 21 MPa and clay bricks with the compressive strength of 30 MPa. A more specific object of the present invention is to provide reliability by recycling silica which is not utilized and to provide high compressive strength silica mortar and its manufacturing method which can save energy by exhibiting a higher compressive strength than cement, polymer cement, and clay bricks after curing for 28 days.

Furthermore, another embodiment of the invention provides products that protect natural environment by using low-grade silica, which is neglected and disposed to molding, landfills and around mines. The object of the present invention is to provide a high compressive strength silica mortar which can exhibit the strength of 70.0 MPa after curing for 28 days and its manufacturing method which is as easy as the manufacturing method for cement products.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION

Figure 1:
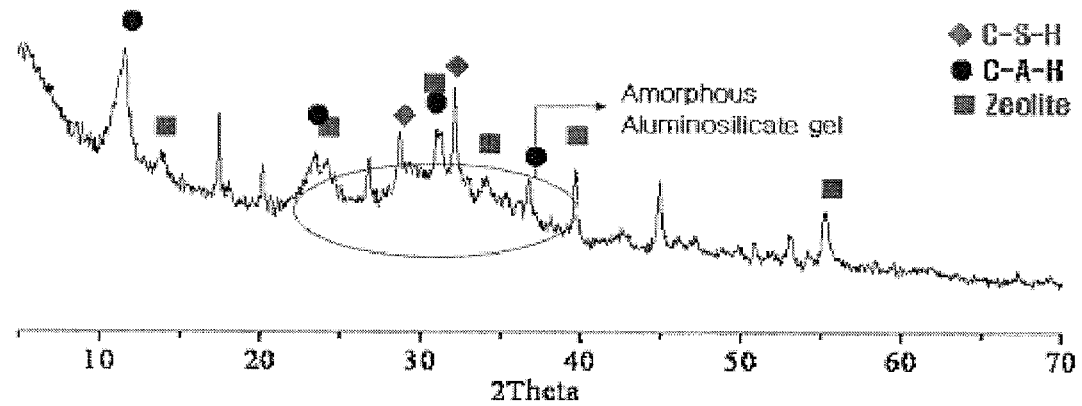
FIG. 1 illustrates a XRD diffraction pattern for silica mortar manufactured by the manufacturing method according to the present invention.

The present invention will now be described more fully hereinafter with reference to the accompanying drawings, in which exemplary embodiments of the invention are illustrated. The invention may, however, be embodied in different forms and should not be construed as being limited to the embodiments set forth herein. Rather, these embodiments are provided so that this disclosure will be thorough and complete, and will fully convey the scope of the invention to those skilled in the art.

The main components of the high compressive strength silica mortar of the present invention are silica powder under 212 μm and silica particles of 212 μm to 2 mm at the ratio of 4:6, blast furnace slag of 6,000 cm²/g or greater, and polycondensation regulator with $Al_2O_3$ and NaOH as main materials. It is manufactured with 30 to 60 wt % of silica, 40 to 70 wt % of blast furnace slag, and the 15 to 35 weight parts of polycondensation regulator that has the specific gravity range of 1.3 to 1.5 for 100 weight parts of dry mortar of these silica and blast furnace slag.

Moreover, a technical feature of the high compressive strength silica mortar manufacturing method of the present invention is the compressive strength of the silica mortar which is at least 70.0 MPa by vibration forming of slurry mixture of 30 to 60 wt % of silica, 40 to 70 wt % of blast furnace slag, and the 15 to 35 weight parts of polycondensation regulator for 100 weight parts of dry mortar powder of these silica and blast furnace slag, curing it at 25 to 80° C. before removal of form and aging for 28 days at normal temperature.

[1] Silica

The low-grade silica used in the present invention is generated from mining in general silica mines and filled in land. Low-grade silica is generated from the blast and pulverization processes to mine silica, and the desirable composition is 30~50 wt % of particles under 212 μm (average grain size 50 μm) and 50 to 70 wt % of particles between 212 μm and 2 mm. If the size of silica particles is outside this range, it is difficult to exhibit high strength. The chemical composition of low-grade silica varies by mine, so we do not define the range of composition in particular.

[2] Blast Furnace Slag

Blast furnace slag is a by-product of pig iron manufacturing in a blast furnace. Although there is no particular limitations, it is desirable to use those of Blaine 6,000 cm²/g or greater. The reason for this is that the higher the fineness of blast furnace slag, the shorter is the response time and it is easier to create Geopolymeric Matrix in mortar.

Specifically, those of 6,000 cm²/g and 8,000 cm²/g which are produced and sold from Basic Material Research Institute, a Korean company, are recommended. When you use those with the fineness of 6,000 cm²/g or lower, the compressive strength of the mortar becomes low: only 30 MPa or lower at age of 28 days, and efflorescence and cracks occur, decreasing the stability of mortar. Furthermore, if Blaine is higher than this, the yield rate of manufacturing is low, raising the price and lowering the price competitiveness.

Therefore, the present invention used the fineness of 6,000 cm²/g or higher for the blast furnace slag. Also, 40 to 70 wt % is desirable because when a wt % under 40 is used, the initial strength is low and it is difficult to achieve high strength. In particular, the compressive strength was 34 MPa when 30 wt % was added. Moreover, under a high volume of blast furnace slag over 70 wt %, the reaction of hydration occurs by the CaO in the blast furnace slag and heat is generated inside.

This hydration heat leads to cracks in mortar, lowering the strength and causing other problems. Unlike low-grade silica, the chemical composition of the blast furnace slag is 88.6 wt % of $SiO_2+Al_2O_3+CaO$ and 11.4 wt % of other elements.

Geopolymer and Zeolite consist of a three-dimensional network structure of $Na_2O$, $SiO_2$ and $Al_2O_3$. The difference between these two matters is only the difference of crystal quality. Therefore, $SiO_2$ and $Al_2O_3$ in the slag are important sources of Geopolymer and Zeolite. However, the contents of $SiO_2$ and $Al_2O_3$ in the blast furnace slag are 29% and 13%, respectively, with a difference of approximately 2.2 times as shown in Table 1 below.

TABLE 1

| | Chemical composition of blast furnace slag | | | | | | | | |
| Division | $SiO_2$ | $Al_2O_3$ | CaO | $Fe_2O_3$ | $K_2O$ | $TiO_2$ | MgO | $SO_3$ | $Na_2O$ |
| --- | --- | --- | --- | --- | --- | --- | --- | --- | --- |
| 1 Blast furnace slag (8,000) | 29.4 | 13.0 | 46.2 | 0.3 | 0.5 | 1.2 | 3.8 | 5.0 | 0.2 |
| 2 Blast furnace slag (6,000) | 29.3 | 12.8 | 46.8 | 0.3 | 0.5 | 1.1 | 3.5 | 5.1 | 0.2 |
| Al-Dross | 8.85 | 74.75 | 1.79 | 2.89 | — | 0.52 | 4.57 | — | 3.30 |

[Polycondensation Regulator]

The polycondensation regulator used in the present invention provides $[Al^{3+}]$ which is the main skeleton structure in the Geopolymer Matrix chain, which is manufactured by condensation polymerization, and plays the role of forming alkali atmosphere (pH 13.5 or higher) for geopolymerization. Furthermore, $OH^-$ of polycondensation regulator destroys the coating of blast furnace slag and cuts the covalent bonding of Si—O and Al—O, inducing ion elution reaction.

The eluted ions form monomers between silica particles and blast furnace slag particles, and these monomers cause condensation polymerization by the energy supplied by curing and form Geopolymeric Matrix. When the curing temperature is 80° C., both Zeolite and Geopolymeric Matrix are generated.

The polycondensation regulator used in the present invention was manufactured by the applicant (inventor). Recommended raw materials of the polycondensation regulator are those that contain a high volume of Al such Aluminum Dross and Aluminum metals. Aluminum Dross is a waste from melting of aluminum and 6000 tons are generated in Korea every year. Because 74.8% of it is $Al_2O_3$, It supplements $[Al^{3+}]$ ions for generation of Geopolymeric Matrix and Zeolite, accelerating the generation of monomers.

For more specific manufacturing method of the polycondensation regulator, the ratio of $Al_2O_3$ and NaOH was adjusted to 1:1, and the ratio of powder and solution was adjusted in tune with the preset specific gravity. Then while they were mixed at high speed using a stirrer, the ions were eluted for seven days at 70° C. to produce a perfect solution.

Meanwhile, the polycondensation regulator was used in the present invention to solve the shortcomings of conventional alkali stimulants such as potassium silicate, sodium silicate, NaOH, KOH, and $Ca(OH)_2$. The conventional potassium silicate and sodium silicate have the pH range of 11 to 12, which is very lower than pH 13.5 which is needed to cause geopolymerization, and the compressive strength of the manufactured mortar also was low at 15 to 20 MPa. The reason for this low strength is that potassium silicate or sodium silicate is hardened quickly by contacting with blast furnace slag, which causes cracks in the specimen that has been aged for a long time.

Another weakness of potassium silicate and sodium silicate is that they are weak in waterproofness. Also, while NaOH, KOH, and Ca (OH)$_2$ have higher pH and better workability than potassium silicate and sodium silicate, they have such problems of low compressive strength, expansion, and efflorescence.

On the other hand, the polycondensation regulator proposed in the present invention is a solution produced from Al-Dross and the pH was adjusted to 13.5 or higher. With the adjustment of pH range that can cause geopolymerization and provision of Al$_2$O$_3$, which is insufficient in blast furnace slag, Geopolymeric Matrix and Zeolite are produced in early stage to exhibit high strength.

Moreover, until recently, for the polycondensation regulator for Geopolymerization, which may be written as alkaline stimulant, NaOH and KOH separately; KOH+NaOH of a composite liquid phase; and addition compositions of composite liquid phases or composite powder compositions, such as NaOH+Na$_2$SiO$_3$ system, NaOH+K$_2$SiO$_3$, KOH+K$_2$SiO$_3$ system, KOH+Na$_2$SiO$_3$ (Sodium Silicate) system, NaOH+ Na$_2$SiO$_3$ (Sodium Silicate)+Ca (OH)$_2$, NaOH+K$_2$SiO$_3$+Ca (OH)$_2$ system, KOH+K$_2$SiO$_3$+Ca (OH)$_2$ system or KOH+ Na$_2$SiO$_3$(Sodium Silicate)+Ca(OH)$_2$ system, have been used. However, these compositions have low compressive strength, are a very high price, and it is difficult for the compositions to form sufficient products In addition, Metakaolin (about 40%) was used as a source material for Al$_2$O$_3$ to produce Geopolymeric Matrix. In this case, the compressive strength is similar to the level suggested by the present invention, but this method is not appropriate for reducing the CO$_2$ generation because Metakaolin is manufactured by plastic working at 750° C.

Unlike the traditional cases, the present invention tried to solve this problem by producing the product within a shorter time and adding Sodium Aluminate, which is a mixture of NaOH and Al$_2$O$_3$ for higher strength.

Meanwhile, if we add Al-Dross as powder and NaOH as liquid as described above, the Al inside the Al-Dross reacts with NaOH and generates air bubbles. Therefore, it is desirable to add Al-Dross as liquid.

The polycondensation regulator used in the present invention is characterized by the mole ratio of 1:1 for Al$_2$O$_3$ and NaOH.

The present invention first mixes the dry powders of silica and blast furnace slag in a kitchen mixer, mortar mixer, or fan mixer, and adds the polycondensation regulator for the liquid/solid ratio of 15 to 35 weight parts for 100 weight parts of dry mortar powder. This is mixed in a mortar mixer to manufacture a slurry type product. This manufactured slurry shows fluidity enough to flow at 250 or more. It is filled and formed in a vibration forming machine.

The molding product from the present invention is completed by curing in a curing apparatus adjusted to the normal temperature of about 25° C. after removal of form. In particular, the high-strength silica mortar using silica produced by the present invention can be shipped as product by only aging at normal temperature after curing.

The implementation principle of the present invention can be understood more easily by the embodiments and comparisons described below.

EMBODIMENT 1

To 100 weight parts of dry mortar powder that consists of 40 wt % of silica, 60 wt % of blast furnace slag 1 (8,000 cm$^2$/g), 33 weight parts of polycondensation regulator with the specific gravity of 1.45 was added to produce a slurry mixture, which was filled and formed in a vibration forming machine. This specimen was cured for 12 hours at 50° C., the form was removed and aged at normal temperature for completion. The manufacturing conditions are shown in Table 2. (Same below).

Figure 2:
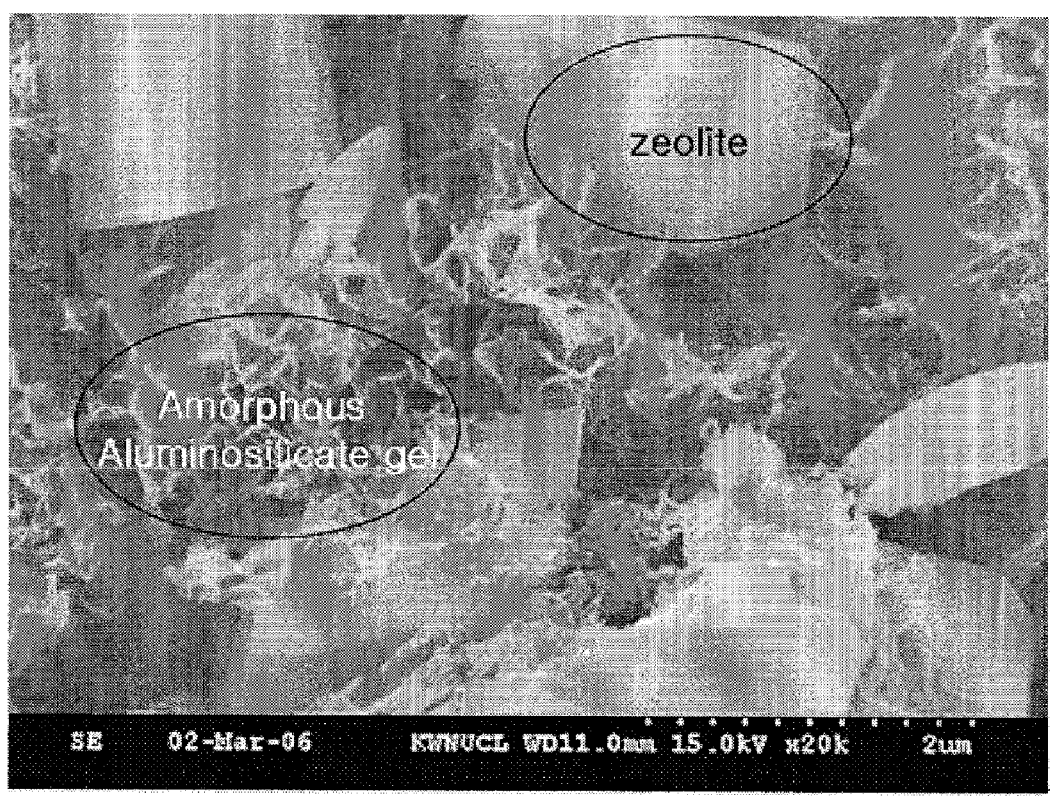
FIG. 2 is a scanning electron microscope picture illustrating the inside of silica mortar manufactured by the manufacturing method according to the present invention.
Figure 3:
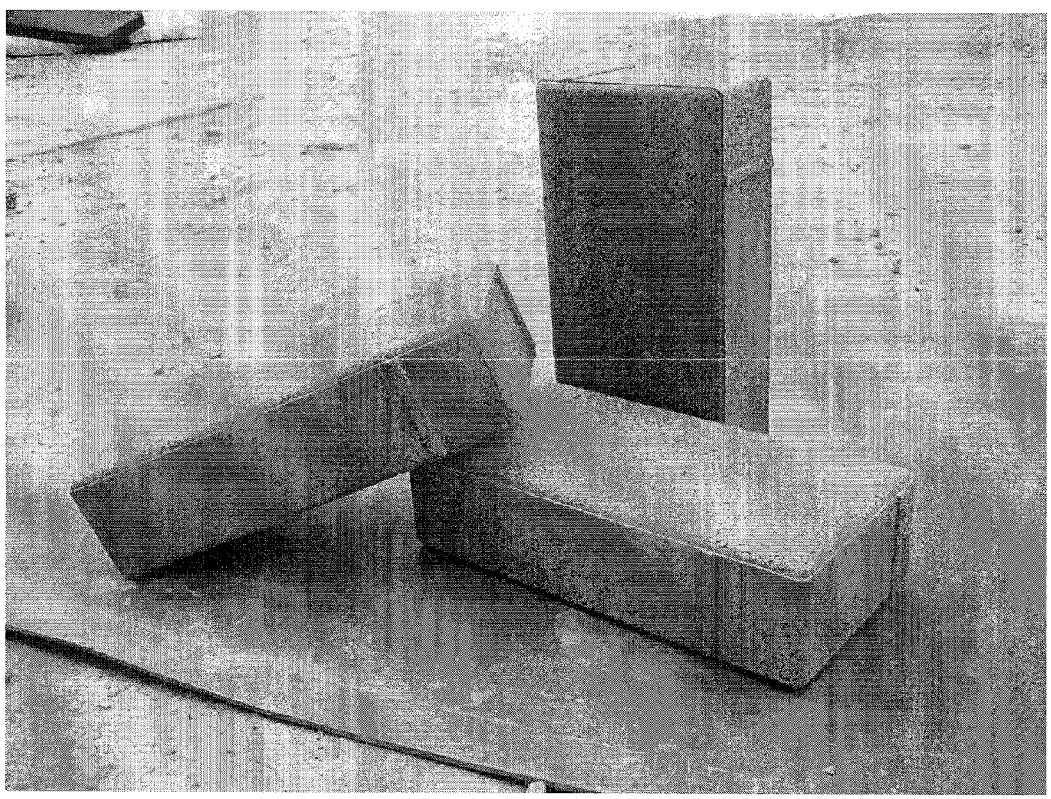
FIG. 3 is a picture illustrating the silica brick product using the silica mortar manufactured with the manufacturing method according to the present invention.
Figure 4:
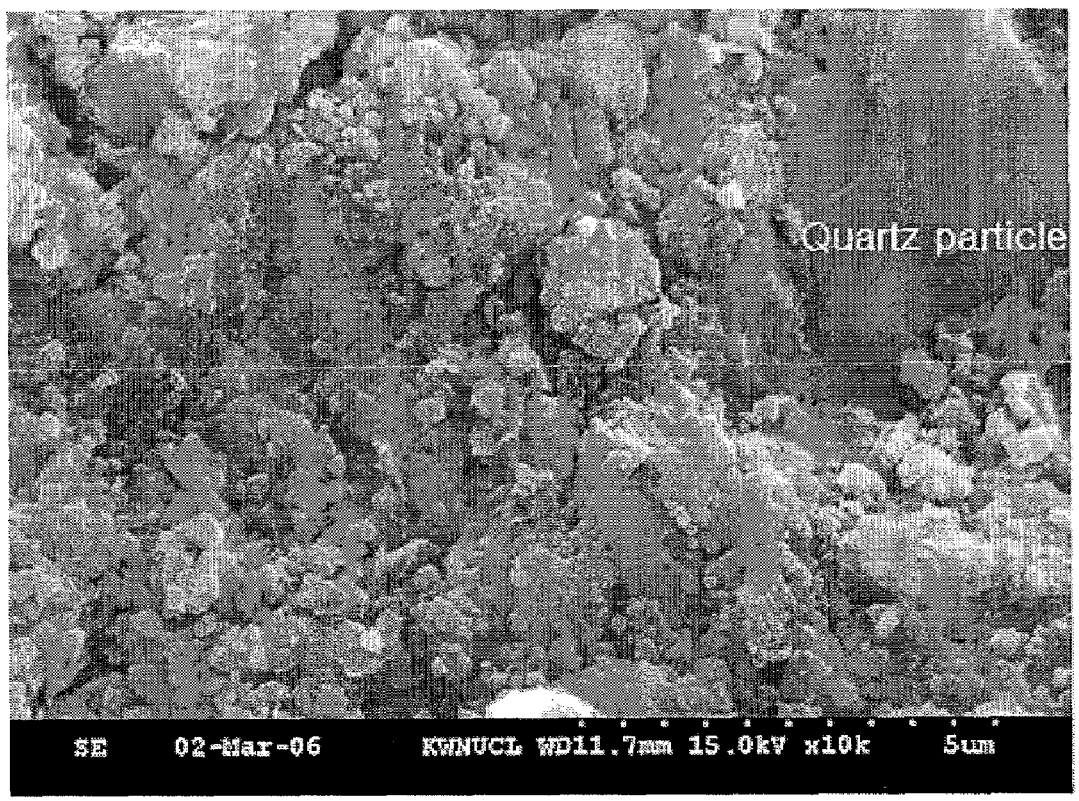
FIG. 4 is a scanning electron microscope picture illustrating the inside of silica mortar as 1 comparison according to the present invention.
Figure 5:
FIG. 5 is a scanning electron microscope picture illustrating the inside of normal Portland cement mortar as Comparison 6 according to the present invention.

The new crystalline peak inside the silica mortar obtained from this embodiment was as shown in FIG. 1, and the microscope picture and outside picture are shown in FIGS. 2 and 3. FIG. 1 shows that inside the block of the present invention are clear amorphous, C-A-H, and C—S—H phases of Zeolite and Geopolymer Matrix. FIG. 2 shows the clear development of the shape estimated to be the three-dimensional networked Geopolymer Matrix (Aluminosilicate gel, amorphous pattern) and the crystals of Zeolite (rectangular parallelepiped).

FIG. 3 is a picture of the silica brick product using the silica mortar manufactured with the manufacturing method for high-strength silica mortar using silica.

EMBODIMENT 2

Embodiment 2 is identical to Embodiment 1, but the silica is changed to 60 wt %, blast furnace slag 1 to 40 wt %, and the polycondensation regulator to 22 weight parts.

EMBODIMENT 3

Embodiment 3 is identical to Embodiment 1, but the silica is changed to 50 wt %, blast furnace slag 1 to 50 wt %, and the polycondensation regulator to 27.5 weight parts.

EMBODIMENT 4

Embodiment 4 is identical to Embodiment 1, but the silica is changed to 30 wt %, blast furnace slag 1 to 70 wt %, and the polycondensation regulator to 35 weight parts.

EMBODIMENT 5

Embodiment 5 is identical to Embodiment 1, but the polycondensation regulator is changed to 15 weight parts.

EMBODIMENT 6

Embodiment 6 is identical to Embodiment 1, but the blast furnace slag is changed to 2 wt %.

EMBODIMENT 7

Embodiment 7 is identical to Embodiment 6, but the silica is changed to 60 wt %, blast furnace slag 2 to 40 wt %, and the polycondensation regulator to 22 weight parts.

EMBODIMENT 8

Embodiment 8 is identical to Embodiment 1, but the polycondensation regulator is changed to specific gravity 1.35.

[Comparison 1]

Comparison 1 is identical to Embodiment 1, but the blast furnace slag is changed to 3 wt %.

[Comparison 2]

Comparison 2 is identical to Embodiment 1, but the blast furnace slag is changed from 1 to 30 wt % s and the polycondensation regulator to 16.5 weight parts.

[Comparison 3]

Comparison 3 is identical to Comparison 2, but the blast furnace slag is changed to 2 wt %.

[Comparison 4]

Comparison 4 is identical to Embodiment 1, but the polycondensation regulator is changed to 10 weight parts.

[Comparison 5]

Comparison 5 is identical to Embodiment 1, but the polycondensation regulator is changed to NaOH of specific gravity 1.28.

[Comparison 6]

Comparison 6 is identical to Embodiment 1, but the polycondensation regulator is changed to Sodium Silicate of specific gravity 1.38.

[Comparison 7]

Comparison 7 is identical to Embodiment 1, but the polycondensation regulator is changed to specific gravity 1.25.

[Comparison 8]

In accordance with cement mortar manufacturing method, cement and Jumunjin standard sands were dry mixed at the ratio of 1:2.45. Then water was added to this at the ratio of W/C 0.3 and they were wet mixed. This mortar mixture was filled into a cube mold and vibration formed. This specimen was cured for 12 hours at 60° C. in a steam curing apparatus to complete the manufacturing of the specimen. The compressive strength of the completed specimen was measured at the age of 3, 7, and 28 days.

Further, cement generating enormous amounts of $CO_2$ can be replaced with the high compressive strength silica mortar, thereby controlling global warming and providing economic profit from the activation of industry and market creation according to the development for the utilization of low-grade silica.

In particular, the high compressive strength silica mortar according to the manufacturing method of the present invention may exhibit the compressive strength of 70.0 MPa or more at age of 28 days after curing at 25 to 80° C. for 12~28 hours before removal of form. Accordingly, the mortar may be utilized as replacement materials of cement for building materials of construct, building landscape materials and constructs, and may be also utilized as materials for human well-being capable of controlling environmental pollution problems by not using cement or organic polymer at all, thereby resulting in the utilization thereof with respect to environmental or energy aspects.

While the present invention has been particularly shown and described with reference to exemplary embodiments thereof, it will be understood by those skilled in the art that various changes in form and details may be made therein without departing from the spirit and scope of the present invention as defined by the appended claims. Accordingly,

TABLE 2

Production condition of silica mortar and test result of compressive strength

| ITEM | 규식 | WT % Slag 1 (8,000 cm$^2$/g) | WT % Slag 2 (6,000 cm$^2$/g) | WT % Slag 3 (4,000 cm$^2$/g) | Weight parts for 100 wt % Polycondensation regulator (Specific Gravity 1.40) | Compressive Strength (MPa) 3 Day | 7 Day | 28 Day |
|---|---|---|---|---|---|---|---|---|
| Embodiment 1 | 40 | 60 | | | 33 | 22.0 | 30.8 | 95.7 |
| Embodiment 2 | 60 | 40 | | | 22 | 15.6 | 22.3 | 80.6 |
| Embodiment 3 | 50 | 50 | | | 27.5 | 21.5 | 26.6 | 76.4 |
| Embodiment 4 | 30 | 70 | | | 35 | 24.5 | 33.1 | 91.8 |
| Embodiment 5 | 40 | 60 | | | 15 | 15.8 | 22.3 | 71.9 |
| Embodiment 6 | 40 | | 60 | | 33 | 19.4 | 27.1 | 84.2 |
| Embodiment 7 | 60 | | 40 | | 22 | 13.7 | 19.6 | 70.9 |
| Embodiment 8 | 40 | 60 | | | Gravity 1.35 | 24.7 | 55.3 | 71.5 |
| Comparison 1 | 40 | | | 60 | 33 | 14.9 | 30.9 | 50.2 |
| Comparison 2 | 70 | 30 | | | 16.5 | 13.1 | 17.2 | 34.2 |
| Comparison 3 | 70 | | 30 | | 16.5 | 11.6 | 15.1 | 30.1 |
| Comparison 4 | 40 | 60 | | | 10 | no forming allowed by lack of moisture | | |
| Comparison 4 | 40 | 60 | | | Industrial NaOH Gravity 1.27(8 M) | 53.2 | 60.0 | Crack |
| Comparison 5 | 40 | 60 | | | Industrial Na$_2$SiO$_3$ Specific Gravity 1.38 | no forming allowed by flash setting | | |
| Comparison 6 | 40 | 60 | | | Specific Gravity 1.25 | 13.2 | 21.1 | 57.1 |
| Comparison 7 | | Cement:Standard sand = 1:2.45 | | | | 32.0 | 38.4 | 47.1 |

As described above, a high compressive silica strength mortar according to the manufacturing method of the present invention can improve the utilization of low-grade silica generated at activity procedure for silica mine; can recycle wastes inducing pollution problems by manufacturing a high compressive silica mortar utilizing low-grade silica as a part of new use development; and can protect the environment by utilizing low-grade silica piled-up, which may damage the scenery around mine.

these and other changes and modifications are seen to be within the true spirit and scope of the invention as defined by the appended claims.

It will be apparent to those skilled in the art that modifications and variations can be made in the present invention without deviating from the spirit or scope of the invention. Thus, it is intended that the present invention cover any such modifications and variations of this invention provided they come within the scope of the appended claims and their equivalents. Accordingly, these and other changes and modifications are seen to be within the true spirit and scope of the invention as defined by the appended claims.

What is claimed is:

1. A high compressive strength silica mortar, comprising: a slurry mixture comprising b 30 to 60 wt % of silica which is formed by mixing silica powder under 212 μm and silica particles of 212 μm to 2 mm at a ratio of 4:6, 40 to 70 wt % of blast furnace slag having of a fineness of 6,000 cm$^2$/g or more to make shorter reaction time, and 15 to 35 weight parts of polycondensation regulator which comprises Al-Dross+NaOH and has a range of specific gravity 1.3~1.5 for 100 weight parts of dry mortar powder comprising the silica and blast furnace slag.

2. A method of manufacturing a high compressive strength silica mortar, comprising: vibration forming of the slurry mixture of claim 1; and curing it at 25 to 80° C.

3. The method of claim 2, wherein Geopolymeric Matrix C-A-H and Zeolite are generated in the silica mortar.

4. The method of claim 2, further comprising: curing the silica mortar before removal of form and aging for 28 days at a temperature of about 25° C., wherein the silica mortar has a compressive strength of 70.0 MPa or more after curing for 28 days.

5. The method of claim 4, wherein the aging for 28 days occurs at a normal temperature of 25° C.

6. The method of claim 2, further comprising: curing the silica mortar before removal of form and aging for 28 days, wherein the silica mortar has a compressive strength of 70.0 Mpa or more after curing for 28 days.

* * * * *